Figure 11:
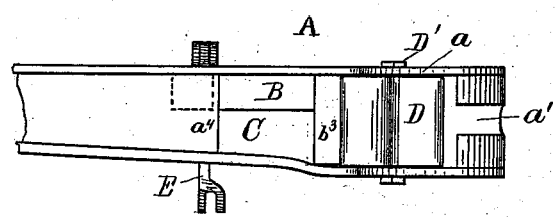

(No Model.) 2 Sheets—Sheet 1.
J. RANCEVAU.
CAR COUPLING.
No. 382,730. Patented May 15, 1888.
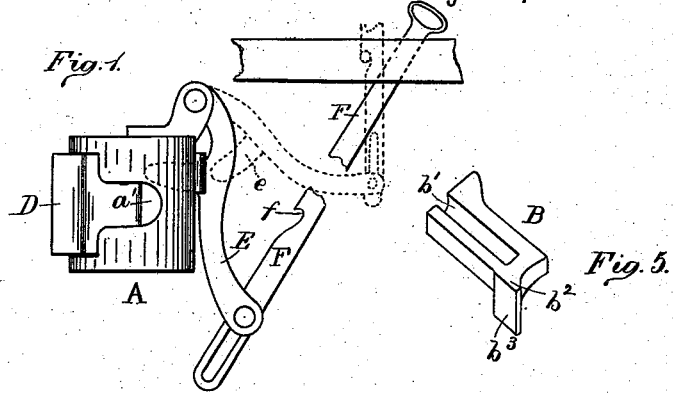
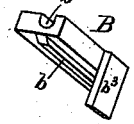
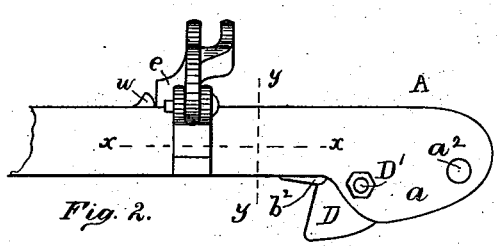
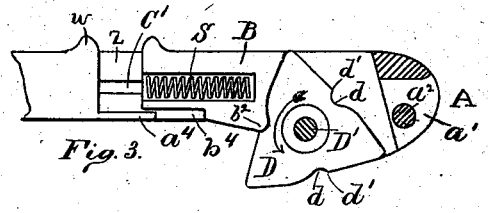
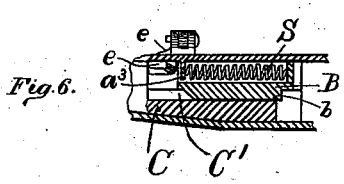
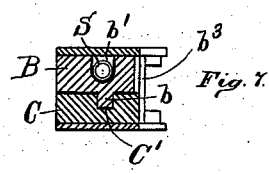
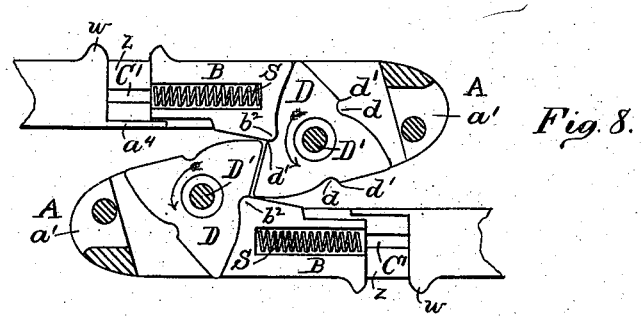
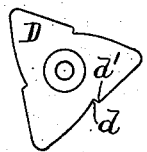
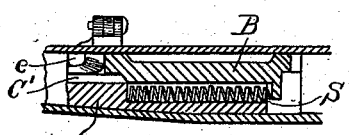
Attest.
W. P. Gulick.
E. M. Harmon.
Inventor.
John Rancevau.
per Wm. Hubbell Fisher
Atty.

(No Model.) 2 Sheets—Sheet 2.
J. RANCEVAU.
CAR COUPLING.

No. 382,730. Patented May 15, 1888.

Attest.
W. P. Gulick.
E. M. Harmon.

Inventor.
John Rancevau,
per Wm. Hubbell Fisher,
Atty.

UNITED STATES PATENT OFFICE.

JOHN RANCEVAU, OF CINCINNATI, OHIO, ASSIGNOR OF ONE-HALF TO JOHN S. PATTERSON, OF SAME PLACE.

CAR-COUPLING.

SPECIFICATION forming part of Letters Patent No. 382,730, dated May 15, 1888.

Application filed May 2, 1887. Serial No. 236,749. (No model.)

*To all whom it may concern:*

Be it known that I, JOHN RANCEVAU, a resident of Cincinnati, Ohio, have invented certain new and useful Improvements in Car-Couplers, of which the following is a specification.

The several features of my invention and the advantages arising from their use, conjointly or otherwise, will be apparent from the following description.

In the accompanying drawings, Figure 1 is a front end view of my improved coupler. Fig. 2 is a top view of same. Fig. 3 represents the front part of the draw-head with the upper plate removed to show the mechanism beneath. Figs. 4 and 5 are perspective views of the sliding block, showing it in different positions. Fig. 6 is a vertical section taken at the line $x$ $x$, Fig. 2. Fig. 7 is a cross-section taken at the line $y$ $y$, Fig. 2. Fig. 8 is a top view of two draw-heads coupled, the view of each being the same as that shown in Fig. 3. Fig. 9 is a section similar to that shown in Fig. 6, and illustrating a modification of the sliding block. Fig. 10 shows a desirable form for the triangular block. Fig. 11 is a side elevation of my device.

The device herein described is an improvement on devices for a similar purpose heretofore patented to me.

The draw-head A is secured to the draw-bar of the car, and provision made by any of the well-known mechanisms for slight lateral oscillation and return to the center line. The front end of the draw-head is rounded off and provided on one side with a beveled face formed by the projecting flanges $a$ of the top and bottom plates. The front of the draw-head is provided with an opening, $a'$, to receive a link, and an opening, $a^2$, for a pin to hold the link when it is desired to couple the cars in the ordinary way or to couple a car provided with my improved coupling to a car provided with one of the ordinary link-coupling heads. The front portion of the bar is open between the upper and lower plates to accommodate the operative parts of the device.

The sliding block B rests on the ledge C, and is guided in its movement thereon by the tongue $b$, which fits in the longitudinal groove $C'$. (Shown in Figs. 6 and 7.) The upper portion of the block B is channeled out, forming the depression $b'$, which latter holds the spring S. The front end of the block is provided with the projecting shoulder $b^2$, which fits in the grooves in the coupling-block D, hereinafter described. As a means for keeping the open space in the draw-head closed against the entrance of dust and ashes, the block B is provided with the downwardly-projecting lip $b^3$. For a similar purpose the lip $a^4$ is provided. The lip $a^4$ projects forwardly from the rear portion of the draw-head, and is received in the recess $b^4$ of the block. The spring S bears against the downwardly projecting lug $a^3$ at the rear, as shown in Fig. 6, and in front against the block B, thus tending to force the block B forward.

The general outline of the coupling-block D is preferably that of an equilateral triangle. It is pivoted in the draw-head by means of the pin D'. Each face of the block D is provided with a vertical groove, $d$, one side of which is rounded off, while the other terminates in a shoulder, $d'$. The front end of the block B is shaped to fit the face of the coupling-block D, the shoulder $b^2$ fitting in the groove $d$ and bearing against the shoulder $d'$.

Instead of making the groove $d$ curved at the bottom, I sometimes make it angular, as shown in Fig. 10. The curved form is the preferred one. As shown in Fig. 9, I sometimes provide a groove in the ledge C to receive the spring S, which gets a bearing against the rear end of this groove, and also against a lug projecting down from the sliding block B. The lever E is pivoted to the edge of the draw-head. It is provided with a tooth, $e$, which, when the lever is down, fits behind the sliding block B and prevents its backward movement. The bar F is attached to the free end of the lever E preferably by a slotted joint, as shown. The bar F extends above the platform, and is provided with the notch $f$, to be caught over a pin to hold the bar up.

The mode of operation of the device is as follows: As two cars approach each other, the beveled faces of the draw-heads meet each other, and each is forced laterally until the projecting angles of the blocks D pass each other, when the draw-heads are returned to their original positions, interlocking, as shown in Fig. 8. With the cars thus coupled, they are held securely together as long as the tooth $e$ is behind the sliding block B. When it is desired to uncouple the cars, the tooth $e$ of each coupler is withdrawn from its socket behind the block B by raising the bar F, as indicated by dotted lines in Fig. 1. Traction now causes the blocks D to rotate in the directions indicated by the arrows in Fig. 8, which movement enables the blocks to slip past each other and allow the cars to be uncoupled. When the coupling-block D revolves in the direction of the arrow, it causes the block B to move back against the tension of the spring S. When the corner of the coupling-block D passes the shoulder $b^2$ of the block B, the latter immediately flies forward automatically through the agency of spring S and the coupling-block is brought to the proper position, and the lever E, being dropped, locks it in this position. The spring S keeps the block B against the coupling-block D, and thus not only holds the block D in position for coupling, but leaves the space Z behind the block and between it and the shoulder W of the draw-head fully open for the reception of the tooth $e$, so that the latter can be easily inserted into said space Z without friction, and the coupling-block be easily locked in position.

It is evident that so long as the tooth $e$ is in position the sliding block B cannot be forced backwardly and the block D cannot rotate. In coupling the cars there is a tendency to cause the blocks D to rotate in the opposite direction to that indicated by the arrow. Such a movement would interfere with the proper locking of the device, and is to be avoided. It is prevented in my device by the jamming of the shoulder $b^2$ of the block B against one of the shoulders $d'$ of the block D.

A special advantage of the device as at present constructed consists in providing the flanges $b^3$ and $a'$, which serve to close the open space and prevent the entrance of cinders or other objects which might interfere with the proper action of the operating parts.

While that feature of my invention which relates to the notch $d$ of the coupling-block D is preferably employed with that feature of my invention which relates to a spring, S, for advancing block B against the coupling-block D, nevertheless it may be employed without said spring.

It may here be remarked that while the various features of my invention are preferably employed together, one or more of them may be employed without the remainder, and in so far as applicable one or more of said features may be employed in connection with coupling devices other than those specifically hereinbefore set forth.

What I claim as new, and desire to secure by Letters Patent, is—

1. The draw bar and head and the revolving triangular block D, each face of which is provided with a groove, $d$, and shoulder $d'$, having an abrupt face forming one wall of the groove $d$, in combination with sliding block B, having projection $b^2$ adapted to fit in the groove $d$ and against the shoulder $d'$, substantially as and for the purposes specified.

2. The draw bar and head and the revolving triangular block D, each face of which is provided with a groove, $d$, and shoulder $d'$, having an abrupt face forming one wall of the groove $d$, in combination with sliding block B, having projection $b^2$ adapted to fit in the groove $d$, and means for locking the block B against the block D, substantially as and for the purposes specified.

3. The draw bar and head and the combination of the revolving triangular block D, each face of which is provided with a groove, $d$, and shoulder $d'$, having an abrupt face forming one wall of the groove $d$, sliding block B, having projection $b^2$ adapted to fit in the groove $d$ and against the shoulder $d'$, and lever E, provided with tooth $e$ for insertion between block B and a projection or shoulder of the draw-head, substantially as and for the purposes specified.

4. The draw bar and head and the combination of the revolving triangular block D, each face of which is provided with a groove, $d$, and shoulder $d'$, having an abrupt face forming one wall of the groove $d$, and sliding block B, having shoulder $b^2$ projecting to the line of strain and adapted to fit in the groove $d$ and against the shoulder $d'$, substantially as and for the purposes specified.

5. The draw bar and head and the combination of revolving triangular block D, having faces provided with grooves $d$ and shoulder $d'$, and a sliding block, B, having shoulder $b^2$, shaped substantially as set forth, and lever E, provided with tooth $e$, and slotted lever F, substantially as set forth.

6. The combination of the draw bar and head and triangular coupling-block D, sliding block B, spring S, and a wedge or plug to intervene between the sliding block and a fixed point on the draw-bar to lock the sliding block in position, substantially as specified.

7. The combination of the draw bar and head, triangular block D, each face of which is provided with groove $d$ and shoulder $d'$, sliding block B, provided with shoulder $b^2$, spring S, and a wedge or plug to intervene between the sliding block and a fixed point on the draw-bar to lock the sliding block in position, substantially as specified.

8. The combination of the draw-head A, provided with transverse open space in which the triangular block D is pivoted, the triangular block D, having in each face groove $d$ and shoulder $d'$, and sliding block B, provided with lip $b^3$ and shoulder $b^2$, substantially as set forth.

9. The combination of the draw-head A, provided with transverse open space in which the triangular block D is pivoted, the triangular block D, having in each face a groove, $d$, and shoulder $d'$, and sliding block B, and lip $a^4$, projecting from the draw-head, substantially as set forth.

10. The combination of the draw-head A, provided with transverse open space in which the triangular block D is pivoted, the triangular block D, having in each face a groove, $d$, and shoulder $d'$, and sliding block B, provided with lip $b^3$ and shoulder $b^2$ and lip $a^4$, projecting from the draw-head, substantially as set forth.

11. In a car-coupler, the combination of revolving triangular block D, having grooves $d$, respectively provided with shoulders $d'$, sliding block B, having shoulder $b^2$, provided with lip $b^3$ and tongue $b$, draw-head provided with spaces $a'$, lug $a^3$, shoulder or abutment $w$, lip $a^4$, and groove C', tooth $e$, connected with lever E, and slotted bar F, substantially as set forth.

JOHN RANCEVAU.

Attest:
O. M. HILL,
W. P. GULICK.